July 24, 1951     E. KIEFER     2,561,381
EXPANDIBLE LINK STRAP
Filed Oct. 28, 1948     2 Sheets-Sheet 1
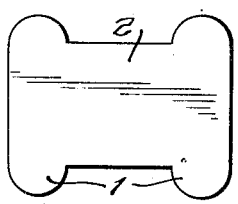
FIG.1.
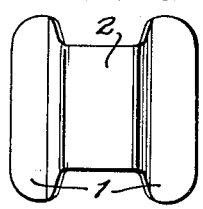
FIG.2.
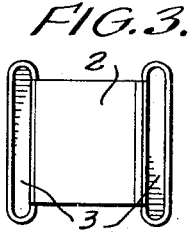
FIG.3.
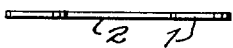
FIG.1a.
FIG.2a.
FIG.3a.
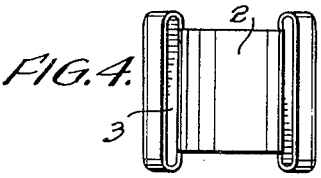
FIG.4.
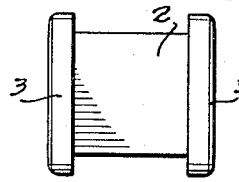
FIG.5.
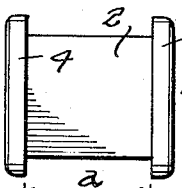
FIG.6.
FIG.4a.
FIG.5a.
FIG.6a.
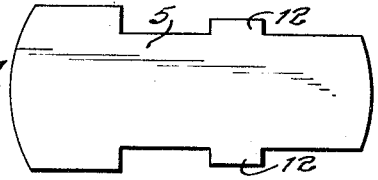
FIG.7.
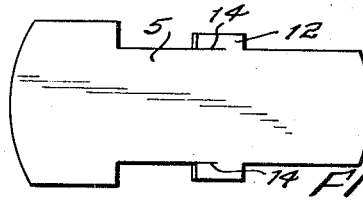
FIG.8.
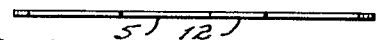
FIG.7a.
FIG.8a.
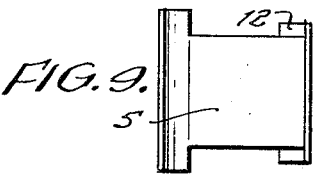
FIG.9.
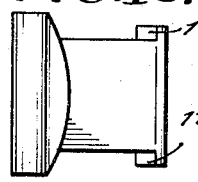
FIG.10.
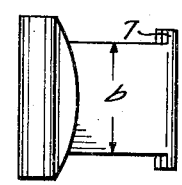
FIG.11.
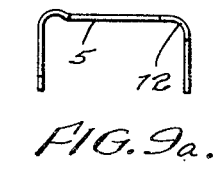
FIG.9a.
FIG.10a.
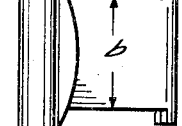
FIG.11a.
INVENTOR.
Emile Kiefer
BY July 24, 1951        E. KIEFER        2,561,381
EXPANDIBLE LINK STRAP
Filed Oct. 28, 1948        2 Sheets-Sheet 2
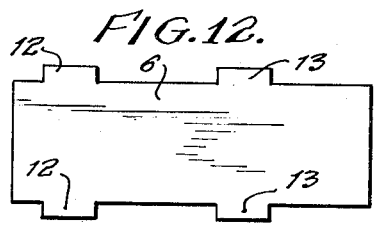
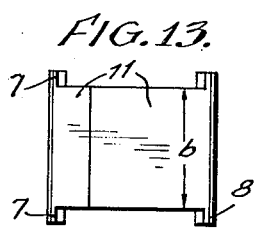
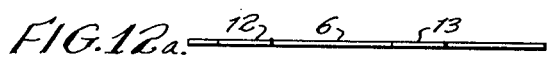
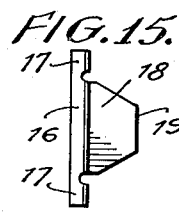
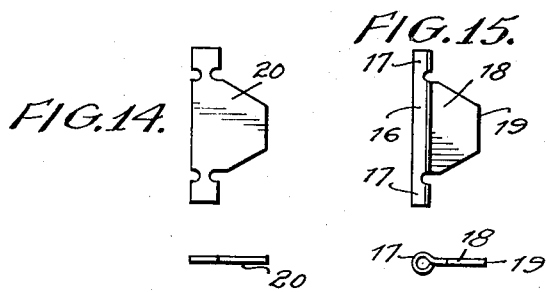
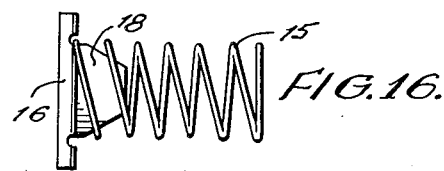
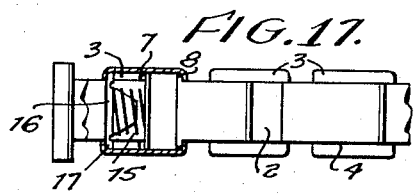
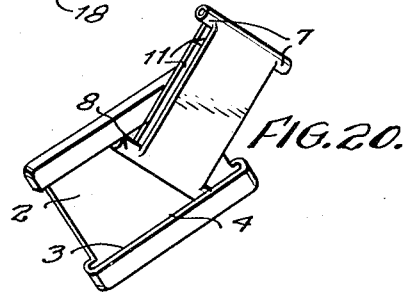
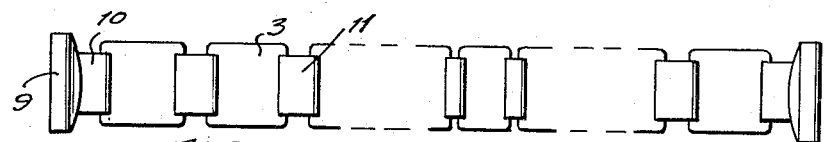
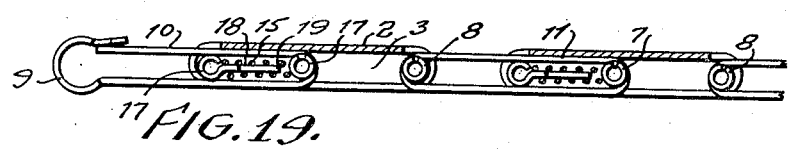
INVENTOR.
Emil Kiefer
BY Patented July 24, 1951

2,561,381

UNITED STATES PATENT OFFICE 2,561,381

EXPANDIBLE LINK STRAP

Emil Kiefer, Pforzheim, Germany, assignor to Richard A. Kiefer, Elberon, N. J.

Application October 28, 1948, Serial No. 57,073
In Germany October 4, 1948

5 Claims. (Cl. 63—5)

This invention relates to an expandible link strap of the type used, for instance, as a bracelet, especially for wrist watches, and to a method of producing elements thereof.

Link straps of this type usually consist of two kinds of links, i. e. the so-called housing or frame links and the so-called rouleau links connecting the frame links and being slidably guided therein against spring action. The frame links of the conventional expandible bracelets consist of four fixedly interconnected legs arranged at right angles to each other, one pair forming the reinforced longitudinal edges of the strap and the other transverse pair, which is reduced with respect to the first one and thereby smaller in size, forming on the one hand the strap joints together with the rouleau links, and on the other hand the supports for the springs permitting the expansion of the bracelet.

The known expandible bracelets have the drawback of gaping on the skin when expanded, whereby hairs may get into the gaps between the links, which are sharply pinched as the gaps are closed, and torn out when moving or expanding the bracelet on the arm, which is very painful. It is even more disagreeable if fine skin portions are pinched in which have to be freed again by renewed expanding. Since the expanding of these bracelets on the skin has such disadvantages, they are at best suitable for ensuring a snug fit of the bracelet on the arm and to adapt it to the small swellings of the muscles owing to movements of the hand. However, they have to be provided with a buckle which permits opening the bracelet for taking it off and locking it when putting it on. Stripping the closed bracelet over the arm and the hand for taking it off or putting it on, without operation of a buckle, is not feasible owing to the pinching in of hair and skin thereby caused.

Another drawback of the conventional expandible bracelets consists in that it is difficult to use plated metal for their manufacture, since the frame links obtained by stamping at their longitudinal edges have outwardly directed cuts which of course have no coating of the precious plating metal. However, it is the very outside where plated articles for the sake of their permanently nice appearance must be plated with a good and non-corrosive metal layer.

However, if the frame members of the known type are not made by stamping, the four legs have to be soldered together, which requires four solderings at each frame member which is very expensive, anyway, while in case of plated metal the layer of precious metal must even be carefully covered.

It is the object of the present invention to provide a type of links, more particularly housing or frame links, which avoid the said and other disadvantages of the known expandible bracelets.

With this object in view, my novel frame links, omitting fixed transverse legs, have each two pockets forming the longitudinal edges of the bracelet and being rigidly connected by a plate forming mainly the closed and therefore smooth back of the braclet and having on the one hand the rouleau members hinged therein by their own joint trunnions while on the other hand a traverse or cross bar is loosely inserted for forming a fulcrum for the one end of the spring whose opposite end is supported between special guide pins or trunnions of the rouleau members which are guided in said pockets with the aid of said guide pins.

This new form of the links permits manufacturing the elements without soldering and by a full-automatic process. Moreover, each part can be interchanged without using a tool which is very important both in case of defective elements and for interchange of broken springs as well as for quickly and easily adapting the width of the bracelet to the arm.

Also, the use of plated metal for making the links, and more particularly the housing links does not meet with difficulties with respect to the longitudinal edges of the bracelet. These edges remain completely covered with the precious metal on the outside, being rounded off on all sides. The cuts lying on the view side are inwardly directed and covered by edges of the rouleau members.

My novel links and a method for manufacturing the same automatically will now be described in greater detail with reference to the accompanying drawing, showing by way of example and purely schematically some embodiments thereof, and in which:

Figs. 1, 1a, 2, 2a, 3, 3a, 4, 4a, 5, 5a, 6 and 6a show each a plan view and a side view of the frame member in the consecutive steps of the manufacturing process;

Figs. 7, 7a, 8, 8a, 9, 9a, 10, 10a, 11, 11a, 12, 12a, 13 and 13a similarly show each a plan view and a side view of the so-called rouleau members including the member serving for securing the bracelet e. g. to the stirrup of the case of a wristwatch, said member being in the form of a spring hook, as especially represented in Figs. 7 to 11;

Figs. 14, 14a, 15, 15a, 16 and 16a similarly show each a plan view and a side view of the traverses or cross bars loosely inserted in the frame members;

Fig. 17 shows a plan view, partly in section;

Fig. 18 shows a side view of a finished bracelet for a wrist watch;

Fig. 18a shows the rear view thereof;

Fig. 19 shows a central longitudinal section of the wrist watch bracelet drawn on a larger scale, and Fig. 20 is a perspective view, also on a larger scale, of a frame member and a rouleau member, as the latter is engaged or disengaged.

Similar reference numerals denote similar parts in the different views.

Referring now to the drawings in greater detail, the method of producing a frame member and a rouleau or flat sleeve member, e. g., of sheet metal, will be described as follows:

The stamped plate 2, provided at its ends with portions 1 of increased breadth, is pressed in a die or swage into the double-cranked shape as shown in Fig. 2. The portion 1 and the plate 2 are now no longer in the same plane. In a further swage or mould the portions 1 are shaped into trough-shaped pockets 3, Fig. 3, having closed ends. In order to turn the openings of the latter towards each other, the middle portion of the plate is at first bent or buckled in the manner as shown in Fig. 4 and then the whole member is straightened, as per Fig. 5, whereby the frame member, consisting of one piece, is finished so as to form a substantially rectangular central plate having two trough-shaped pockets having closed ends and being arranged along opposite edges of the substantially rectangular central plate. Since in the finished strap the rouleau or flat sleeve members have to be guided between the open edges 4 of pockets 3, the latter must be made exactly parallel, which may be effected, e. g., by longitudinal milling. Now the distance $a$ of the edges 4 of the opening, Fig. 6, agrees in all parts with the width $b$ of the rouleau or flat sleeve members, Figs. 11 and 13.

By way of alternative, the frame members may be produced in the new shape by another method, e. g. by way of die-casting or moulding of plastic or synthetic material.

The flat sleeve members, Figs. 7 to 13, are also made of a single punched piece or stamping 5, or 6, resp., forming in a new manner also the guide projections or trunnions 7 and the joint projections or trunnions 8, Figs. 11 and 13. Both, the spring hook flat sleeve member, Figs. 7 to 11, and the ordinary flat sleeve member, Figs. 12 and 13, are made by raising (Fig. 9) and bending over (Fig. 10) the ends of the stampings 5 or 6, resp. Thus, the hook 9 and the spring tongue 10 of the flat sleeve member as per Fig. 1, and the back 11 of the ordinary flat sleeve member as per Fig. 13 are formed. In order to produce the guide and joint trunnions 7 or 8, lateral tabs 12 or 13 are provided at the stampings 5 and 6 and indented at their foot line at 14, Fig. 8, to about half of their width. Since the tabs 12 and 13 are positioned at the bent portions of the flat sleeve members, they are bent at their non-indented portion anyway as the member 5 is bent, Fig. 10. The indented portion is then also bent round, thus forming circular projections or noses 7 or 8 out of tabs 12 or 13. In the finished strap, each of these projections is engaged in a pocket 3 of two adjacent frame members, as shown in Figs. 17 and 19. As a guide trunnion 7 they prevent the flat sleeve member from falling out of the frame member in which the flat sleeve member can be moved against action of spring 15, and as a joint trunnion 8 they permit swinging of the same rouleau member with respect to the adjacent frame member, in whose pockets 3 the projections 8 are engaged, while the projections 8 can be disengaged from the pockets 3 at any time, e. g., for interchange, as shown in Fig. 20. The rolling of the projections 7 or 8 is effected in such a way that they are recessed with respect to the front side of the frame and flat sleeve members by the thickness of the metal sheet, whereby the two members come to lie flush in the finished bracelet.

The loosely inserted tranverse Figs. 14 to 16, has a portion 16 which is reinforced by beads and terminates on each side in a tab portion 17 which is rolled to form a trunnion or holding pin. Advantageously the portion 16 also bears towards its free end a tapered lug 18 on which the spring 15 is seated, Fig. 16, and which also forms an abutment 19 for the flat sleeve member which is pulled out of the frame member when expanding the bracelet, thus preventing excessive compression of spring 15, Fig. 19. The tranverse which is engaged with the holding pins 17 in the pockets 3 and like the other elements of the bracelet may be made of one piece 20, Fig. 14, not only serves as a support for spring 15 and as an abutment 19 for the rouleau or flat sleeve member, but it also serves as a guide for the latter in its movements in the frame member. Instead of making the traverse of a single stamping 20 it is also possible to make it of two sheet metal pieces by pinching a separately stamped lug 18 into the joint of the rolled portion 16. The lug 18, whether being formed integral with part 16 or secured in the joint thereof as a separate stamping, is spaced from the inner walls of the rouleau or flat sleeve members in such a way that room is left for the helical turns of spring 15. Where part 16 and lug 18 are formed of one piece of material, the space for the spring is provided by bending off lug 18 at its foot, Fig. 15.

By the novel design of the links the disadvantages mentioned above are removed. The strap, therefore, is very suitable for making bracelets, more particularly for wrist watches, without any buckle or other closing device. The closed bracelet can easily be stripped over the hand without pinching in the skin or hair. The rouleau members which during this operation partly pass out of the frame members in case of proper adaptation of the width of the bracelet to the arm recede entirely into the frame members after the stripping over, so that the gap produced during the expansion, Fig. 17, through which the plates 2 of the frame members become visible, have closed themselves entirely in the position of rest of the members.

The members or elements have been shown in plane form in the drawing. However, it is also contemplated to make them in a concave form, as viewed from the inner side, or convex, as viewed from the outer side, which makes also for a nicer appearance.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In an expandible link strap a link unit comprising in combination a flat frame member composed of a substantially rectangular central plate and two trough-shaped pockets having closed ends and being arranged along opposite edges of said substantially rectangular central plate; a flat sleeve member fitting into said frame member between said trough-shaped pockets of the same; a pair of connecting projections arranged at one end of said flat sleeve member projecting in opposite directions and reaching into said trough-shaped pockets of said frame member; a holding pin passing through said flat sleeve member and reaching into said trough-shaped pockets of said frame member and a compression spring member arranged within said flat sleeve member abutting at one end against said holding pin and at its other end against said one end of said flat sleeve member.

2. In an expandible link strap a link unit comprising in combination a flat frame member composed of a substantially rectangular central plate and two trough-shaped pockets having closed ends and being arranged along opposite edges of said substantially rectangular central plate; a flat sleeve member fitting into said frame member between said trough-shaped pockets of the same; a pair of connecting projections arranged at one end of said flat sleeve member projecting in opposite directions and reaching into said trough-shaped pockets of said frame member; a holding pin passing through said flat sleeve member and reaching into said trough-shaped pockets of said frame member freely movable relative to both said members; and a compression spring member arranged within said flat sleeve member abutting at one end against said holding pin and at its other end against said one end of said flat sleeve member.

3. In an expandible link strap a link unit comprising in combination a flat frame member composed of a substantially rectangular central plate and two trough-shaped pockets having closed ends and being arranged along opposite edges of said substantially rectangular central plate; a flat sleeve member fitting into said frame member between said trough-shaped pockets of the same; a pair of connecting projections arranged at one end of said flat sleeve member projecting in opposite directions and reaching into said trough-shaped pockets of said frame member freely movable relative to both said members; a tapered lug being integral with said holding pin and being arranged within said flat sleeve member; and a compression spring member arranged within said flat sleeve member abutting at one end against said holding pin and at its other end against said one end of said flat sleeve member and surrounding said tapered lug.

4. In an expandible link strap a link unit comprising in combination a flat frame member composed of a substantially rectangular central plate and two trough-shaped pockets having closed ends and being arranged along opposite edges of said substantially rectangular central plate; a flat sleeve member fitting into said frame member between said trough-shaped pockets of the same; a first pair of connecting projections arranged at one end of said flat sleeve member projecting in opposite directions and reaching into said trough-shaped pockets of said frame member; a second pair of connecting projections arranged at the other end of said flat sleeve member projecting in opposite directions into the trough-shaped pockets of the next consecutive frame member and being adapted to abut against the consecutive sleeve member in the link strap; a holding pin passing through said flat sleeve member and reaching into said trough-shaped pockets of said frame member freely movable relative to both said members; and a compression spring member arranged within said flat sleeve member abutting at one end against said holding pin and at its other end against said one end of said flat sleeve member.

5. An expandible link strap comprising in combination, a plurality of consecutively arranged frame members each composed of a substantially rectangular central plate and two trough-shaped pockets having closed ends and being arranged along opposite edges of said substantially rectangular central plate; a plurality of consecutive flat sleeve members each fitting into two consecutive ones of said frame members between said trough-shaped pockets of the same; first pairs of connecting projections arranged, respectively, at one end of each of said flat sleeve members projecting in opposite directions and reaching into said trough-shaped pockets of one of said consecutive ones of said frame members; second pairs of conecting projections arranged, respectively, at the other end of said flat sleeve members projecting in opposite directions into the trough-shaped pockets of the next consecutive frame member and being adapted to abut, respectively, against the next one of said consecutive sleeve members; holding pins passing, respectively, through said flat sleeve members and reaching, respectively, into said trough-shaped pockets of said frame members; tapered lugs being integral, respectively, with said holding pins and being arranged, respectively, within said flat sleeve members; and compression spring members each being arranged, respectively, within one of said flat sleeve members abutting at one end against one of said holding pins, respectively, and at its other ends against said one end of said flat sleeve member and surrounding said tapered lug.

EMIL KIEFER.

REFERENCES CITED

The following references are of record in the file of this patent:

UNITED STATES PATENTS

| Number | Name | Date |
|---|---|---|
| 1,207,366 | Bruner | Dec. 5, 1916 |
| 1,670,663 | Johnson et al. | May 22, 1928 |
| 1,672,007 | Stelter | June 5, 1928 |